Feb. 27, 1951 P. D. HOLOWKA 2,543,109
FLUID PRESSURE ACTUATED CUTTING TOOL
Filed May 14, 1948 2 Sheets-Sheet 1
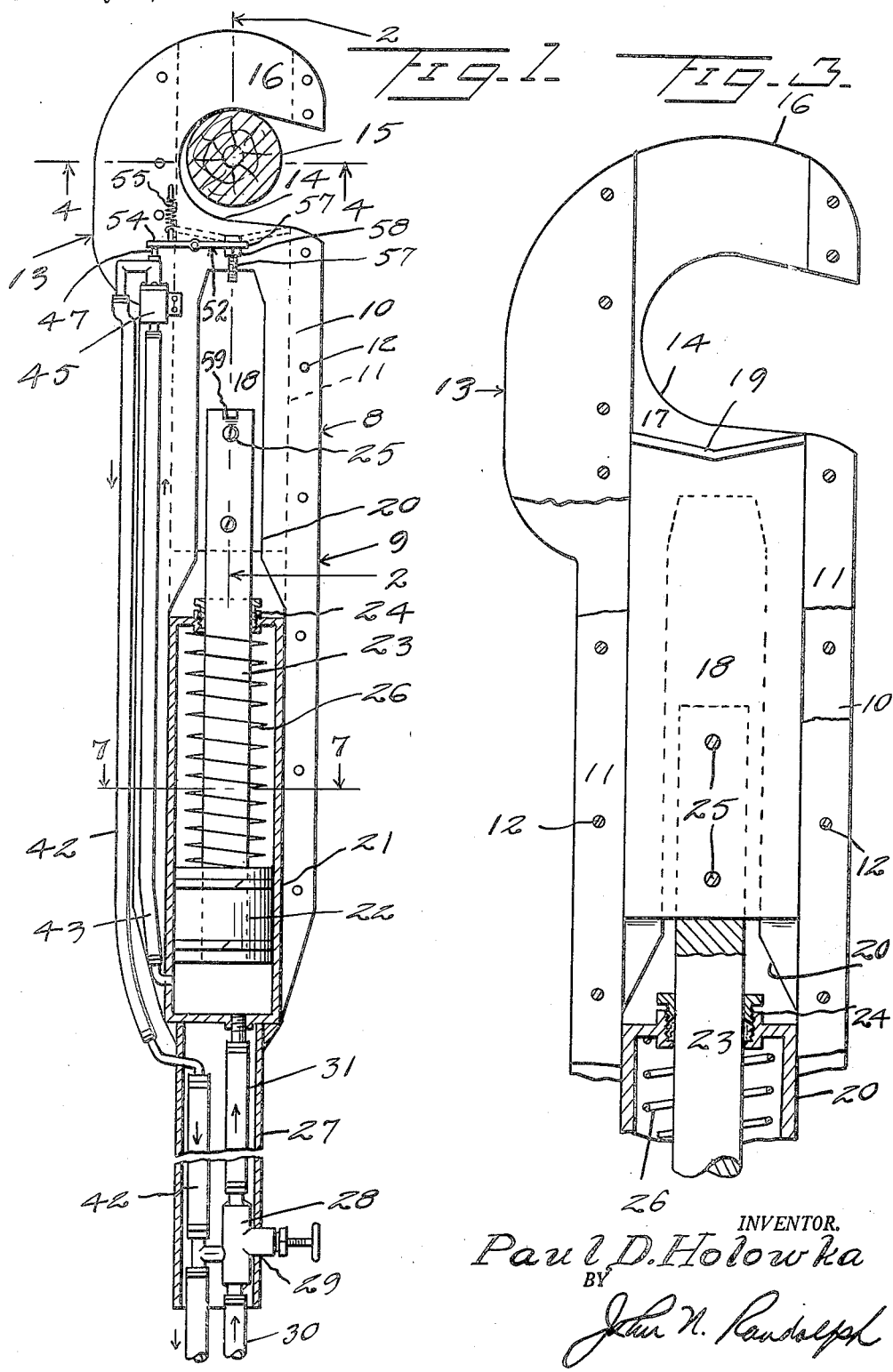
INVENTOR.
Paul D. Holowka
BY
John N. Randolph Feb. 27, 1951     P. D. HOLOWKA     2,543,109
FLUID PRESSURE ACTUATED CUTTING TOOL
Filed May 14, 1948     2 Sheets-Sheet 2
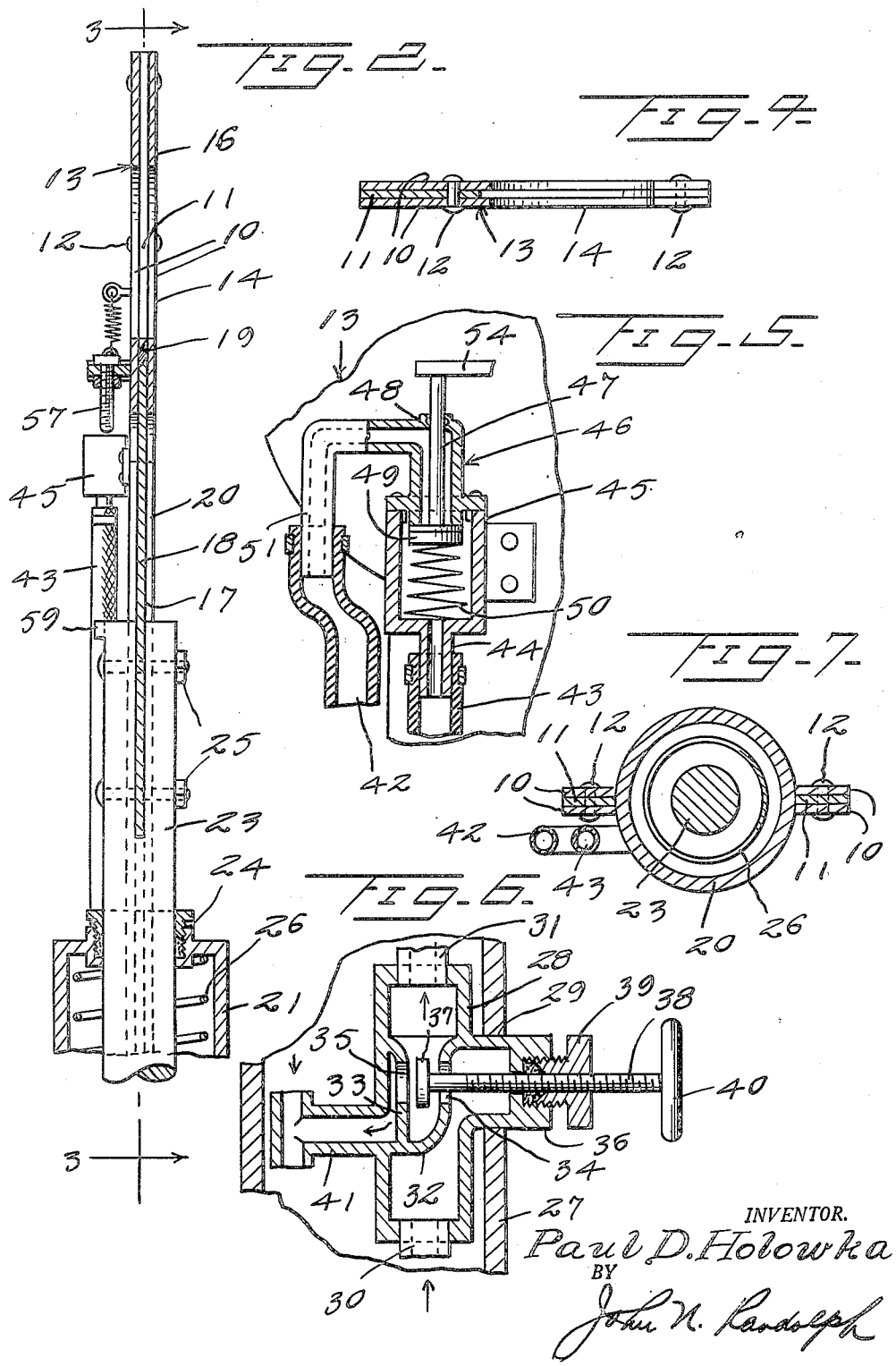
INVENTOR.
Paul D. Holowka
BY
John N. Randolph Patented Feb. 27, 1951

2,543,109

UNITED STATES PATENT OFFICE 2,543,109

FLUID PRESSURE ACTUATED CUTTING TOOL

Paul D. Holowka, York, Pa.

Application May 14, 1948, Serial No. 26,987

5 Claims. (Cl. 30—228)

This invention relates to a novel pruning tool or implement for cutting off limbs and branches of trees and bushes or which may be utilized for cutting roots and heavy undergrowth and more particularly has reference to a fluid actuated cutter for this purpose.

Still a further and important object of the present invention is to provide a fluid actuated cutting tool including a movable cutting blade actuated in response to a fluid pressure medium; said tool having automatically actuated bleeder means for dissipating the fluid pressure when the blade has reached a fully projected position for automatically releasing the fluid pressure on the blade after the cutting operation has been completed and to prevent damage to the tool.

Still a further object of the invention is to provide a tool or implement of the aforedescribed character having a novel valve control means for controlling the supply of the compressed medium.

Various other objects and advantages of the invention will hereinafter become more fully apparent from the following description of the drawings, illustrating a presently preferred embodiment thereof, and wherein:

Figure 1 is a side elevational view, partly in longitudinal section showing the tool or implement with the blade in a retracted position;

Figure 2 is an enlarged longitudinal sectional view taken substantially along a plane as indicated by the line 2—2 of Figure 1;

Figure 3 is a sectional view taken substantially along a plane as indicated by the line 3—3 of Figure 2;

Figure 4 is a cross sectional view of the head of the tool taken substantially along a plane as indicated by the line 4—4 of Figure 1;

Figure 5 is an enlarged sectional view, partly in side elevation of a part of the conduit of the compressed medium including the release valve;

Figure 6 is a similar view of another part of the conduit including the manually controlled shutoff valve, and Figure 7 is a cross sectional view of the tool taken substantially along a plane as indicated by the line 7—7 of Figure 1.

Referring more specifically to the drawings, the fluid pressure actuated cutting tool in its entirety is designated generally 8 and includes a frame or housing 9 formed of corresponding plates 10 having spacing strips 11 interposed between the side edges thereof and which plates 10 are connected to one another and to the strips 11 by fastenings 12. The frame 9 is enlarged adjacent its outer end or head 13 and said head is provided with a laterally opening recess 14 adapted to receive a limb or other member 15 to be cut and whereby said head 13 is substantially hook-shaped and with the outer portion thereof defining a stationary jaw 16 against which the limb or other member 15 to be cut, when disposed within the recess 14, will bear.

The strips 11 combine to space the plates 10 from one another and are likewise spaced relatively to each other to form a guideway 17 extending longitudinally of the frame 9 and through the head 13 in which an elongated cutting blade 18 is reciprocally disposed and guided. The cutting blade 18 is provided with a sharpened outer end which is slightly V-shaped forming the cutting edge 19 thereof which is normally disposed inwardly of and adjacent the notch or recess 14.

The frame 9 is provided with a slot 20 which extends longitudinally from near the notch or recess 14 to the inner end thereof. A cylinder 21 is anchored in the slot 20 at the inner end of the frame 9 and remote to the head 13 and contains a piston 22 which is reciprocally disposed therein and which has a piston rod 23 extending therefrom reciprocally through a stuffing box 24, located in the end of the cylinder 21 adjacent to the head 13. The outer end of the piston rod 23 is slotted to receive the opposite, inner end of the blade 18 and is secured thereto by fastenings 25 and is disposed to reciprocate in the end of the slot 20 located adjacent the head 13. An expansion coiled spring 26 is disposed in the cylinder 20 between its inner end and the piston 22 for urging the piston rod 23 inwardly of the cylinder 21 for urging the blade 18 toward a retracted position, away from the head 13.

A pipe or tube 27 is secured to and projects from the outer end of the cylinder 21 and from the complementary end of the frame 9 and is provided with an open opposite end. Said pipe or tube 27 forms a handle for the tool 8 and may be of any desired length. A generally T-shaped valve housing 28 is disposed in the pipe or tube 27 and has the lateral leg thereof extending outwardly through an opening 29 of the pipe 27 for mounting the housing 28 therein. As best seen in Figure 6, the valve housing 28 is connected at its outer end to a flexible supply conduit 30 which extends into the tube 27 through the outer open end thereof and the opposite, discharge end of the housing 28 is connected by a flexible conduit 31 to the adjacent end of the cylinder 21. Intermediate of the ends of the housing 28 is disposed two integral partitions or internal walls 32 and 33 provided with ports 34 and 35, respectively which are disposed in transverse alignment with respect to the longitudinal axis of the valve housing 28 and in alignment with the lateral branch 36 of said housing which extends through the opening 29. The partition 32 divides the inlet and outlet ends of the housing 28 connected to the conduits 30, 31, respectively so that a medium passing from the inlet conduit 30 to the outlet conduit 31 must pass through the port 34. A valve 37 is disposed between the partitions or walls 32 and 33 and has a threaded valve stem 38 extending from one side thereof through the port 34 and longitudinally through the branch 36 of the valve housing 28 and outwardly thereof through a stuffing box, designated generally 39, in a portion of which the valve stem 38 is threadedly engaged. The outer end of the valve stem 38 which is disposed externally of the stuffing box 39 is provided with a hand wheel 40 for rotating the valve stem 38 for moving the valve 37 either toward or away from either of the ports 34 and 35 and it will be readily apparent that said valve 37 may be disposed in an intermediate position as seen in Figure 6 so that both of the ports 34 and 35 will be opened or may be moved to a position for closing either of said ports for a purpose which will hereinafter become apparent. The valve 37 may be secured in any suitable manner to the stem 38 and may be applied to the housing 28 through the outlet port thereof. The valve housing 28 is also provided with a small lateral passage 41 which is T-shaped and which is adapted to be connected in a conduit 42, as best seen in Figure 1, for a purpose which will hereinafter be described. The branch conduit 41 extends from the main portion of the valve housing 28 in the opposite direction to the branch 36 and is disposed entirely within the tube 27 and communicates with the main portion of the housing 28 through the port 35 so that when the valve 37 is moved into engagement with the partition 33 for closing the port 35, said branch passage 41 will be closed.

As best seen in Figure 1, a conduit 43 has one end thereof communicating with the cylinder 21 adjacent its outer end and extends therefrom toward the head 13 and has its opposite end communicating with the inlet end 44 of a valve housing 45 which is supported on one side of the frame 9 adjacent the head 13 and which includes a substantially U-shaped outlet section 46 having a downwardly extending flanged leg which connects with the open upper end of the valve housing 45 and through which a valve stem 47 reciprocally extends. The valve stem 47 extends upwardly and outwardly through the intermediate portion of the outlet conduit 46 which is provided with an opening containing packing as seen at 48 for reciprocally receiving the valve stem. A head 49 is disposed in the lower end of the valve stem 47 and which is adapted to engage and close the end of the conduit 46 which extends into the housing 45. An expansion coiled spring 50 which is contained in the housing 45 bears against and yieldably urges the valve 49 into engagement with the outlet conduit 46. The other downwardly extending leg 51 of the outlet conduit 46 is connected to one end of the flexible conduit 42.

As best seen in Figure 1, a lever 52 is pivotally mounted at 53 intermediate of its ends on the head 13 on the same side of and above and adjacent the valve housing 45 and has one end 54 disposed to engage the outer end of the valve stem 47 but which is normally held out of engagement therewith by a contractile spring 55 which is anchored to the head 13 and connected to an extension 56 of the lever end 54 for normally drawing said end away from the valve stem 47 and for causing the lever 52 to rock clockwise on its pivot 53 as seen in Figure 1. A screw 57 extends through the opposite end 58 of the lever 52 in a direction toward the piston rod 23 and is adapted to be adjustably secured to said lever end 57 by a nut 58, carried by the threaded shank of the screw. The slotted end of the piston rod 23 is provided with an outwardly opening notch 59 to receive the end of the screw 57 as the cutting edge 19 of the blade 18 approaches a fully projected position in the head 16 and beyond the notch 14.

Any suitable compressed medium such as an hydraulic or a pneumatic medium under pressure could be utilized for operating the tool 8. For example, the conduit 30 could be connected to an orchard sprayer or the hydraulic pump of a tractor or to an air pump or a chamber containing a compressed fluid medium. Assuming that the implement parts are in the positions as shown in Figure 1 and with the limb 15 engaged in the notch 14 and against the head or stationary jaw 16, the valve handle 40 is rotated to move the valve 37 to a position for exposing the port 34 and to its other extremity so that it will close the port 35. With the valve 37 thus disposed the compressed medium, not shown, will pass from the inlet or supply line 30 through the valve housing 28 and conduit 31 to the outer end of the cylinder 21. As the valve 49 will be in a closed position, the compressed medium will be prevented from escaping from the cylinder 21 through the return line 42 and accordingly will force the piston 22 toward the opposite end of the cylinder 21 for projecting the blade 18 so that its cutting edge 19 will cut through the limb 15. As the cutting edge 19 passes entirely through the notch 14 and into the guideway of the stationary jaw 16, the notch 59 will engage the screw 58 for rocking the lever 52 counterclockwise as seen in Figure 1. This will cause the lever end 54 to exert a pressure on the valve stem 47 for moving the valve 49 downwardly in the housing 45 against the action of the springs 50 for exposing the outlet conduit 46 of the valve housing to permit the compressed medium in the cylinder 21 to escape therefrom through the conduits 41 and 42 thereby preventing the blade 18 and the piston rod 23 from moving beyond a fully projected position so that the piston rod 23 will be prevented from striking the frame 9 and the piston 22 will be prevented from compressing the spring 26 to too great an extent. When this movement of the blade and piston rod toward a projected position is thus interrupted, the operator turns the valve stem 38 for moving the valve 37 into a position for closing the port 34 so that the compressed medium in the cylinder 21 can escape back through the valve housing 28 and its branch 41 into the return line 42 since the valve 49 will return to a closed position as soon as the notch 59 moves out of engagement with the screw 57. The force of the spring 26 will return the piston 22 to its position of Figure 1 for forcing the compressed medium therefrom through the branch conduit 41 and for returning the blade 18 to its fully retracted position of Figures 1 and 3. The return line 42 may be connected to a suitable reservoir for an hydraulic medium or, where a pneumatic medium is utilized, said line may vent to the atmosphere.

Various modifications and changes are contemplated and may obviously be resorted to, without departing from the spirit or scope of the invention as hereinafter defined by the appended claims.

I claim as my invention:

1. A cutting implement comprising a frame having a head provided with a laterally opening notch adapted to receive a member to be cut, said frame having a guideway extending through said head and to beyond said notch, a blade reciprocally disposed in said guideway and having a cutting edge at its leading end disposed for movement through said notch when the blade is moved from a retracted to a projected position for cutting through the member disposed in the notch, and a fluid pressure actuated means mounted in said frame and including a reciprocally disposed pressure responsive element connected to the blade for moving said blade to a projected position in response to a fluid pressure exerted on said element and means including an element connected to the blade and actuated by the fluid pressure responsive element as the blade approaches a fully projected position for releasing the pressure on said element.

2. A cutting implement comprising a frame having a head provided with a laterally opening notch adapted to receive a member to be cut, said frame having a guideway extending through said head and to beyond said notch, a blade reciprocally disposed in said guideway and having a cutting edge at its leading end disposed for movement through said notch when the blade is moved from a retracted to a projected position for cutting through the member disposed in the notch, and a fluid pressure actuated means mounted in said frame and including a reciprocally disposed pressure responsive element connected to the blade for moving said blade to a projected position in response to a fluid pressure exerted on said element, said fluid pressure responsive means including a cylinder fixedly supported in the implement frame, a piston reciprocally disposed in said cylinder, a piston rod connected to the piston and extending reciprocally through one end of the cylinder and connected to said blade, a supply line for the fluid pressure medium communicating with the opposite end of said cylinder, a valve interposed in said supply line for admitting the fluid pressure medium to the cylinder in one position of the valve and for permitting the fluid pressure medium to be dissipated from the cylinder in another position of the valve, a bleeder conduit connected to said cylinder adjacent its last mentioned end, a valve interposed in said bleeder line and normally disposed in a closed position, a lever pivotally mounted intermediate of its ends on the frame and having one end engaging the bleeder line valve, and an element carried by the piston rod for engaging the opposite end of the lever as the blade approaches a fully projected position for rocking the lever to open said bleeder line valve.

3. A cutting implement comprising a frame having a head provided with a laterally opening notch adapted to receive a member to be cut, said frame having a guideway extending through said head and to beyond said notch, a blade reciprocally disposed in said guideway and having a cutting edge at its leading end disposed for movement through said notch when the blade is moved from a retracted to a projected position for cutting through the member disposed in the notch, a fluid pressure responsive actuating means mounted in said frame and including a reciprocally disposed pressure responsive element connected to the blade for moving the blade to a projected position in response to a fluid pressure exerted on the element, said fluid pressure responsive means including a bleeder line for bleeding off the fluid pressure medium, a normally closed valve mounted in said bleeder line, a lever pivotally mounted intermediate of its ends on the frame and having one end engaging said valve, and a projection on said pressure responsive element disposed to engage the other end of said lever as the blade approaches a fully projected position for rocking the lever to open the valve of the bleeder line.

4. A cutting implement as in claim 3, and a member adjustably carried by said last mentioned end of the lever and disposed to be engaged by the projection on the pressure responsive element for varying the time of opening of the bleeder valve with respect to the movement of the blade.

5. A cutting implement as in claim 3, said notch having a downwardly and outwardly inclined upper surface adapted to be engaged by the member to be cut, and said blade having a cutting edge at its leading end provided with inwardly converging portions for cooperation with the upper surface of the notch to retain the member to be cut in engagement with said notch when the blade is projected.

PAUL D. HOLOWKA.

REFERENCES CITED

The following references are of record in the file of this patent:

UNITED STATES PATENTS

| Number | Name | Date |
| --- | --- | --- |
| 2,366,909 | Johnson | Jan. 9, 1945 |
| 2,391,676 | Browning | Dec. 25, 1945 |